Dec. 31, 1946.    A. J. PHILLIPS ET AL    2,413,374
PROCESS FOR PRODUCING ELEMENTAL SELENIUM
Filed March 15, 1944    2 Sheets-Sheet 1
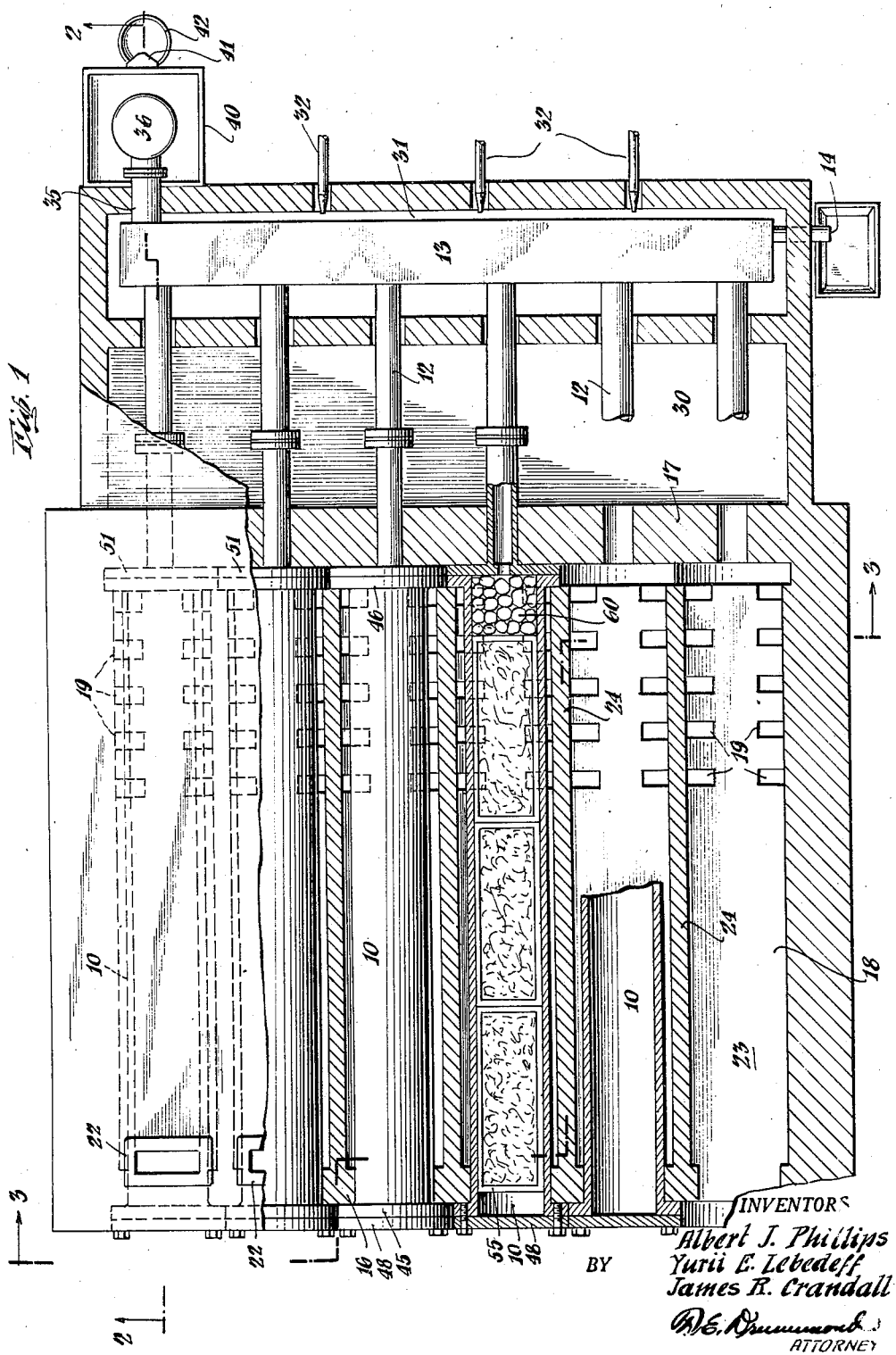
INVENTORS
Albert J. Phillips
Yurii E. Lebedeff
James R. Crandall
BY
ATTORNEY

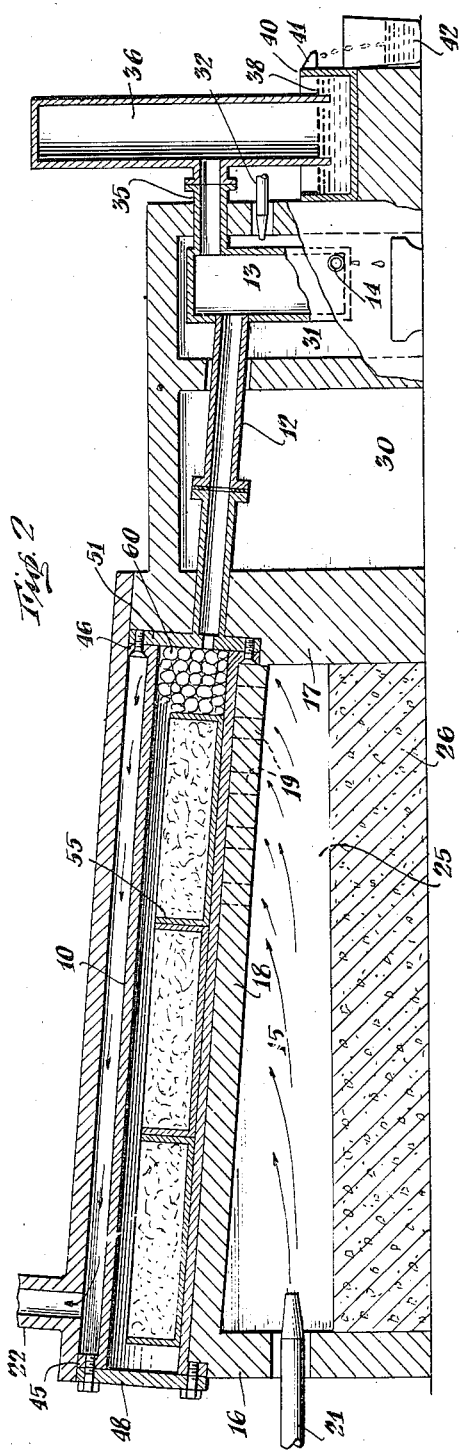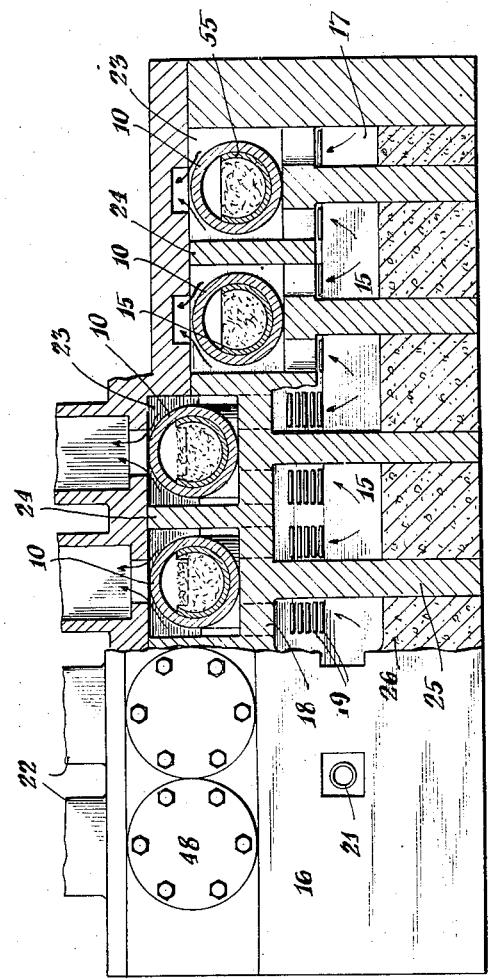

Patented Dec. 31, 1946

2,413,374

UNITED STATES PATENT OFFICE 2,413,374

PROCESS FOR PRODUCING ELEMENTAL SELENIUM

Albert J. Phillips, Plainfield, and Yurii E. Lebedeff and James R. Crandall, Metuchen, N. J., assignors to American Smelting and Refining Company, New York, N. Y., a corporation of New Jersey Application March 15, 1944, Serial No. 526,630

8 Claims. (Cl. 23—209)

This invention relates to a process for treating selenium bearing material to recover selenium as elemental selenium. The invention has been utilized advantageously in the treatment of flue or baghouse dust containing selenium collected during the roasting and doré furnace processing of copper refinery slimes. However, the invention is not limited to the treatment of baghouse dust but may be employed in the processing of raw sludges, slimes and the like material containing selenium.

In treating copper refinery slimes which contain gold, silver, copper, selenium and tellurium, it has been the general practice in most refineries to subject the slimes to an oxidizing roast to assist in the subsequent removal of copper by leaching with acid. During roasting some of the selenium and tellurium present is oxidized and passes into the flue system where it is collected in the baghouse along with other metal values. Most of the selenium, however, is not volatilized and remains in the slimes possibly as doré metal selenides and tellurides. In the conventional practice, selenium is separated from the roasted slimes as sodium selenite by establishing a molten bath of the slimes and adding sodium carbonate and nitre in sufficient amounts to react with the gold and silver selenides present to slag off the selenium in the form of sodium selenite. This sodium selenium slag is subsequently leached with water and neutralized to precipitate tellurium which is recovered as tellurium oxide. After filtering the solution the selenium is then precipitated from the filtrate by acidifying the solution and treating it with sulphur dioxide gas in the conventional manner whereby the selenium is recovered as red amorphous selenium.

The present invention provides a relatively simple process which permits the selective recovery of selenium from selenium bearing baghouse dust without involving the treatment of aqueous solutions of selenium dioxide and acid. The process of this invention results in the direct recovery of elemental selenium from selenium bearing material by a single pyrometallurgical operation and eliminates the necessity of employing solution handling means, centrifuges, stills, and filter press equipment, which is expensive, in order to recover selenium in a commercially valuable form.

According to our process selenium bearing material which may contain 1% or more moisture is placed in a receptacle and sufficient sulphuric acid is added in excess of that required to react with the selenium compounds in the charge and release the selenium. The receptacle containing the charge is then placed in a closed retort and heated to react and drive off the selenium as gaseous selenium and selenium dioxide. The closed retort is provided at one end with a compartment or section which, during operation, is filled with heated coke, charcoal or like carbonaceous reducing reagent. A condenser is connected to this section of the retort to condense the reduced metal vapors. Volatilized $SeO_2$ and Se vapors which are released from the roasted charge are drawn through or over this heated coke whereby the $SeO_2$ vapor is reduced to selenium metal vapor. The latter is recovered as liquid selenium by passing the vapors into a suitable condenser. Moisture and excess $H_2SO_4$ vapor which are intermixed with the selenium vapor are not condensed and pass from the selenium vapor condenser into an outer condenser where these vapors of sulphuric acid and steam are condensed and collected, the waste gases, largely carbon dioxide, being discharged therefrom through a water sealed exit.

In carrying out the process no preliminary digesting of the selenium bearing material is required and the amount of $H_2SO_4$ added usually is only about 5% by weight of the charge depending, of course, on the content of selenium in the material being treated. Preferably the required amount of sulphuric acid is mixed with the charge before it is placed in the retort and no rabbling or stirring of the charge during roasting is necessary as the preliminary mixing is sufficient to adequately disperse the acid throughout the charge whereby the selenium is caused to react with the acid and is driven off as either oxide or elemental Se vapor when heated in the retort. By utilizing the novel heating and reducing arrangement of our invention the digesting and roasting of the charge to release the selenium as gaseous $SeO_2$ and the reduction of this gaseous selenium dioxide to Se prior to condensing is carried out concurrently and in a single retort. The apparatus is easy to operate and the process results in high recoveries of selenium with a minimum loss of values.

Although the novel features which are believed to be characteristic of this invention will be particularly pointed out in the claims appended hereto, the invention itself, as to its objects and advantages, and the manner in which it may be carried out, may be better understood by referring to the following description in connection with the accompanying drawings forming a part thereof in which a typical commercial installation embodying our invention is illustrated.

Fig. 1 is a plan view of one type of apparatus for practicing our invention, the arrangement showing a battery of retorts connected to a condenser, the retorts being shown partly broken away and in section to more clearly illustrate the construction;

Fig. 2 is a vertical sectional view of the apparatus shown in Fig. 1 and taken substantially on line 2—2 of Fig. 1 and looking in the direction of the arrows;

Fig. 3 is a sectional view in elevation taken substantially on the line 3—3 of Fig. 1.

Referring to the drawings in detail 10 designates a retort in which the charge is roasted. A number of these retorts forming a battery may be used, as shown in Fig. 1, where the quantity of material to be treated warrants such an installation. The retorts are each connected to a condenser 12 which in turn is connected to a common condenser and storage receptacle 13 from which liquid selenium is tapped as indicated at 14. The condenser 12, as illustrated in Fig. 2, is arranged to slope downwardly from the retort to the storage condenser receptacle 13 so that as the selenium condenses on the walls of the condenser 12 it will flow away from the retort end and into the large condenser receptacle 13.

For convenience in making a tightly sealed joint between the retort and condenser the retort 10 is also arranged to slope downwardly from the front to the rear in conformity with the slope of the attached condenser 12. To provide for controlled heating of the retort and condenser arrangement they are disposed in temperature regulated compartments of a furnace as illustrated in Fig. 2. To accomplish this the retort 10 is suitably mounted over the furnace combustion chamber 15 by supporting it at its opposite ends in the furnace walls 16 and 17. A baffle wall 18 extends along beneath the retort and is provided with flue openings 19 near the rear wall 17 of the furnace.

Hot gases of combustion produced by the burner 21 pass upwardly through the flue openings 19, as indicated by arrows in Figs. 2 and 3, and circulate about the retort throughout its length heating it uniformly, the waste gases being finally discharged into the stack opening 22 at the front of the furnace. Each retort is contained in a separate compartment 23 utilizing common partitioning walls 24. A wall or pier 25 extends upward from the groundfill 26 beneath the resort chamber providing a firm support for the retort and furnace structure as illustrated in Fig. 3.

In order to maintain the chambers 30 and 31 of the furnace in which the condensers 12 and 13 are mounted at the temperature required for proper operation, auxiliary burners 32 may be utilized. Similar auxiliary burners, not shown, may be utilized to raise the temperature of the chamber 30 where necessary for proper operation of the condenser 12. Waste combustion gases from these burners may be discharged through a separate stack opening not shown. Steam and sulphuric acid vapors which are not allowed to condense in the condenser 13 are passed out through the discharge conduit 35 and into the air cooled condenser 36. This latter condenser is closed at the top while the lower end is sealed by water and condensate 38 retained in the receptacle 40 as shown in Fig. 2.

An overflow spout 41 is provided near the top of the receptacle 40 whereby condensate collected in the receptacle 40 overflows into a receiving vessel 42. Liquid condensate in the receptacle 40 provides a liquid seal for the condenser 36 and is arranged to maintain the entire furnace at a pressure of about one inch of water during the operation.

The retorts 10 are preferably made of cast iron inasmuch as it is resistant to attack. For our commercial installation we have used a standard 10″ cast iron pipe 8′ and 6″ long with flanged end portions 45 and 46. The charging end of the retort is fitted with a removable plate 48 which is machined so that it can be bolted tightly in place. The opposite end of the retort is fitted to the condenser pipe or tube 12 at its flanged end 51, the contacting surfaces being machined so as to fit closely together to provide a sealed connection as illustrated in Fig. 2. Inasmuch as we have found that cast iron is more resistant to attack by selenium than ordinary iron or steel we prefer to make the retort 10 and forepart of the selenium condenser 12 of cast iron. The remaining portion of the condenser 12 and larger condenser receptacle 13 may be made of ordinary iron or steel since these parts are subjected to lower temperatures than the retort and forepart of the condenser 12.

For retaining the charge during roasting boats 55 are utilized. These boats, which may be made of iron, are of suitable length and size so that they can be filled with selenium bearing material and inserted inside the retort 10 as illustrated in Figs. 2 and 3. The boats may be made by slitting a length of 8″ pipe and spreading it so as to fit the 10″ diameter retort and welding ends onto the pipe sections. The size of the boats are preferably such as can be readily loaded and manually handled.

Using our process in the treatment of flue dust, the boats are loaded with selenium bearing baghouse dust mixed with approximately 5% by weight of the dry charge of 60° Bé. sulphuric acid. The boats containing this mixture are placed in the retort which has been previously heated to about 1350° F. Each boat ordinarily contains approximately 70 pounds of material and is operated on a twelve hour cycle. That is, the complete cycle for each retort, including charging and unloading, is 12 hours. When the retort is heated to the proper temperature, ordinary lump charcoal or coke is placed in the rearmost section of the retort as illustrated at 60 in Fig. 2 before the charge boats 55 are inserted. Sufficient charcoal is introduced to reduce all the $SeO_2$ vapor given off by the charge to Se vapor before it passes to the condenser 12.

In carrying out the process the temperature of the retort and charcoal is kept above the boiling point of selenium (1272° F.), otherwise selenium may condense in the charge or retort before it reaches the selenium condenser 12. This, of course, should be avoided. The temperature in the furnace combustion chamber 15 is preferably maintained at about 1350° F. which is somewhat above the boiling point of selenium and assures a temperature of at least 1272° F. in the center of the charge. In view of the very low thermal conductivity of selenium bearing baghouse dust a longer time and higher roasting temperature is required than would otherwise be the case to remove the selenium from the dust particles forming the charge.

The chamber around the selenium condenser 12 and condenser storage 13 is maintained at about 450° F. At this temperature liquid selenium collects on the inside of the condenser pipe 12 and flows by gravity down into the larger condenser 13. In order to cause the liquid selenium to readily flow out of the tap hole 14 the condenser 13 should be kept at a temperature of about 450° F. Should it fall below this temperature the auxiliary burners 32 are operated to raise the temperature so that the selenium flows freely from the condenser 13 which is tapped intermittently. After tapping the selenium from the condenser 13 the auxiliary burners may be turned off.

Where the selenium bearing material contains too much moisture it may be subjected to a preliminary de-watering and drying treatment prior to adding sulphuric acid and roasting. The selenium bearing dust which we have treated as described ordinarily contains upwards of 1% moisture. This moisture is driven off as water vapor along with excess sulphuric acid during the process and is recovered as condensate in the condenser 36. The recovered sulphuric acid may if desired be used over again in a new charge. In addition to the sulphuric acid and water vapor collected in the condenser 36 a small amount, usually less than 1%, of colloidal red selenium escapes from condenser 13 and is deposited on the walls of the outer condenser. This is, however, not lost as it is recharged into the retort and recycled. The residue remaining in the roasted charge at the end of the heating cycle contains about 0.5% selenium.

As a typical example of how our process is carried out, the following is illustrative:

To a charge comprising selenium baghouse dust weighing 40 pounds and assaying 18.6% Se, 2.2 pounds of 60° Bé. $H_2SO_4$ was added and after thoroughly intermixing the acid with the dust at ordinary room temperature conditions the mixture, which was relatively dry, was placed in an iron boat and inserted into the cast-iron retort of the furnace. The retort was tightly sealed and heated to 1350° F. Roasting of the charge was conducted for approximately eight hours.

At a temperature of 600° F. $SeO_2$ was volatilized and around 1300° F. Se was vaporized. Both $SeO_2$ and Se vapors were passed through the heated charcoal, the temperature of the charcoal being maintained at around 1300° F. whereby all $SeO_2$ was reduced to Se while in the vapor phase. The selenium vapor was passed into the condenser 12 which was kept at a temperature such that the Se vapor condensed and flowed into the large condenser and storage receptacle 13 connected thereto as shown in the drawings. Moisture and excess $H_2SO_4$ vapor was carried through the selenium condenser to the outer condenser where it was condensed and collected.

Liquid selenium tapped from the condenser weighed 6.5 pounds. This liquid selenium was cooled quickly in a mold forming vitreous selenium having a black glassy appearance but when viewed through relatively thin sheets appeared dark red. Selenium in the amount of about 1% collected in the condensate along with excess $H_2SO_4$ and was returned to the retort with a new charge. After roasting for eight hours the residue was removed and charged into a cupel furnace for recovery of remaining metal values. The residue taken from the retort was found to contain 0.8% selenium. This material was charged into a cupel furnace for treatment to recover other values.

In the example it will be observed that the initial charge contained about 7.44 pounds of selenium of which 6.5 pounds or 87.5% was recovered as vitreous selenium. A small amount of selenium, usually less than 1% under optimum conditions, escapes to the outer condenser and is found in the condensate along with sulphuric acid and water. This selenim, however, is not lost being returned for treatment with the next charge.

In the specific method described selenium is recovered as liquid selenium which we refer to as elemental selenium. When this liquid elemental selenium is tapped from the condenser and cooled quickly, as by casting in shallow or water chilled molds, a vitreous form of selenium is produced. Where the more stable so-called metallic form is desired the liquid selenium is cooled slowly or the vitreous modification is heated for some time above about 180° F. to cause it to pass over into the metallic form. The several allotropic forms of selenium are well known and it will be obvious that the method of this invention may be utilized to recover selenium in any desired form. Such changes as required to produce the desired form of Se is contemplated to come within the scope of this invention as defined by the appended claims.

It will be apparent from the foregoing description that the method of this invention may be modified to suit the varying conditions incident to using the invention, and while certain novel features of the invention have been disclosed and are pointed out in the annexed claims it will be understood that various omissions, substitutions and changes may be made by those skilled in the art without departing from the spirit and scope of the invention.

What is claimed is:

1. A process for treating selenium bearing material to recover selenium as elemental selenium which comprises intermixing said selenium bearing material with sulphuric acid and subjecting the mixture to a roasting temperature of approximately 1350° F. while shielded from contact with air to react the acid with said material and drive off substantially all the selenium as volatile selenium and selenium dioxide, passing said volatile vapors through heated carbonaceous material to cause the reduction of the selenium dioxide to selenium vapor, and condensing the selenium vapor to recover the selenium as elemental selenium substantially free from sulphuric acid and moisture.

2. A process for treating selenium bearing material to recover selenium as elemental selenium which comprises intermixing said selenium bearing material with sulphuric acid, said acid being introduced in an amount up to about 5% by weight of the charge, heating the mixture substantially out of contact with air to a temperature above the boiling point of selenium and selenium dioxide to react the charge with said acid and bring about volatilization of substantially all the selenium in said material, conducting the selenium vapors over a bed of hot carbonaceous material to cause the reduction of selenium dioxide vapor to selenium vapor, and then condensing said selenium vapors to recover selenium as elemental selenium.

3. A process for treating selenium bearing material to recover selenium as elemental selenium which comprises intermixing said selenium bearing material with sulphuric acid, said acid being introduced in an amount up to about 5% by weight of the charge, heating the mixture while excluding air therefrom to a temperature above the boiling point of selenium and selenium dioxide to react the charge with said acid and bring about volatilization of substantially all the selenium in said material, conducting the vapors evolved during heating over a bed of hot carbonaceous material to cause the reduction of selenium dioxide vapor to selenium vapor, then cooling the vapors which comprise selenium vapor, sulphuric acid and water vapor to a temperature which will cause the selenium vapor to condense but above that at which sulphuric acid and water vapor condense whereby elemental selenium is recovered, and thereafter condensing the sulphuric acid and water vapor.

4. A process for treating selenium bearing baghouse dust recovered from metallurgical furnace operations which comprises intermixing a charge of said selenium bearing material with sulphuric acid in excess of the amount required to react with the selenium compounds present in said charge, heating said charge substantially out of contact with air to react the acid with the selenium of the charge whereby the selenium of the charge is volatilized as $SeO_2$ and Se vapors, subjecting said vapors to a reducing action to bring about the reduction of $SeO_2$ to Se while in the vapor phase, and conducting the resulting stream of selenium vapors, water vapor and sulphuric acid vapor along a course while cooling it to selectively condense the Se vapor in the form of elemental selenium without condensing the sulphuric acid and water vapor present.

5. A process for recovering selenium as elemental selenium from selenium bearing baghouse dust comprising preparing a charge by intermixing approximately 5% by weight of sulphuric acid with a portion of said selenium bearing material, the quantity of acid introduced being based on the amount of selenium present in the portion making up the charge, heating the resultant mixture of selenium bearing material and sulphuric acid to approximately 1350° F. while precluding any substantial access of air to the mixture, holding said charge at this temperature for a time sufficient to cause the selenium compounds to react with the acid and the selenium to be released as $SeO_2$ and Se vapors, conducting said $SeO_2$ and Se vapors along with excess sulphuric acid vapor and water vapor through a reducing atmosphere comprising heated carbonaceous material whereby all the $SeO_2$ is reduced to Se vapor, and selectively condensing the Se vapors from said gaseous mixture of sulphuric acid vapor and water vapor to recover said selenium as elemental selenium.

6. A process for recovering selenium as elemental selenium from selenium bearing baghouse dust comprising preparing a charge by intermixing approximately 5% by weight of sulphuric acid with a portion of said selenium bearing material, the quantity of acid introduced being based on the amount of selenium present in the portion making up the charge, heating said mixture of selenium bearing material and sulphuric acid to approximately 1350° F. with substantial exclusion of air and for a time sufficient to cause the selenium compounds to react with the acid and the selenium to be released as $SeO_2$ and Se vapors, conducting said $SeO_2$ and Se vapors along with excess sulphuric acid vapor and water vapor through heated carbonaceous material whereby all the $SeO_2$ vapor is reduced to Se vapor, selectively condensing the Se vapor from the mixture of sulphuric acid vapor and water vapor to recover said selenium as elemental selenium, and condensing the mixture of sulphuric acid and water vapors which has been substantially depleted of selenium whereby said excess sulphuric acid and water vapors are collected as a condensate for recycling.

7. A process for treating selenium bearing baghouse dust recovered from metallurgical furnace operations which comprises intermixing sulphuric acid therewith in excess of the amount required to react with the selenium compounds present in the resulting charge, heating said charge substantially out of contact with air to react the acid with the selenium of the charge whereby the selenium of the charge is released as $SeO_2$ and Se vapors, passing said vapors through a reducing atmosphere to bring about the reduction of $SeO_2$ to Se while in the vapor phase, conducting the selenium vapors along with water vapor and sulphuric acid vapor into a condenser and condensing the Se vapor in the form of elemental selenium without condensing the sulphuric acid and water vapors present, maintaining the condensed selenium heated to a temperature sufficient to maintain the condensed selenium vapor in a liquid state, drawing off said liquid selenium into a receptacle and quickly cooling the liquid selenium to form vitreous selenium.

8. A process for treating selenium bearing material such as slimes from copper refineries to recover selenium which comprises intermixing the selenium bearing material with sulphuric acid, roasting the mixture substantially out of contact with air to react the selenium bearing material and sulphuric acid and cause the selenium to be released as gaseous selenium dioxide and selenium metal vapor, the selenium containing vapors being intermixed with evolved sulphuric acid and water vapor, subjecting the gaseous mixture to reducing conditions whereby the gaseous selenium dioxide present is converted to selenium metal vapor, cooling the resultant gaseous mixture of selenium metal vapor, sulphuric acid and water vapor to selectively condense the selenium metal vapor to liquid selenium, the cooling temperature to which the vapor mixture is subjected being controlled to cause the selenium metal vapor to condense to liquid elemental selenium while preventing the condensation of sulphuric acid and water vapor, and withdrawing the resulting liquid elemental selenium.

ALBERT J. PHILLIPS.
YURII E. LEBEDEFF.
JAMES R. CRANDALL.